United States Patent Office 2,700,612
Patented Jan. 25, 1955

2,700,612

STABILIZATION OF ORGANIC MATERIALS

Joseph A. Chenicek, Bensenville, Ill., assignor to Universal Oil Products Company, Chicago, Ill., a corporation of Delaware No Drawing. Application January 31, 1951,
Serial No. 208,852

18 Claims. (Cl. 99—8)

This invention relates to a novel method of stabilizing organic materials which tend to deteriorate in storage or in use due to undesirable oxidation reactions.

Various organic compounds including mineral oils, motor fuels, lubricating oils, drying oils, rubber, etc. are adversely affected by oxygen with the resultant formation of undesirable gums and usually with discoloration of the organic compounds, as well as other deleterious reactions. This is particularly true of motor fuels comprising olefinic gasolines, such as cracked gasoline and polymer gasoline.

An object of the present invention is to prevent or at least substantially retard the undesirable deterioration of organic compounds, which may or may not be catalyzed by the presence of minute quantities of metals.

Another object of the present invention is to provide a novel method of adding an inhibitor-metal deactivator to organic compounds.

Another object of the invention is to provide a novel inhibitor-metal deactivator which will function to stabilize organic compounds.

Various inhibitors have heretofore been proposed to prevent or at least substantially retard the deterioration of organic materials, and some of the more successful of these inhibitors are N,N'-dialkyl-p-phenylene diamines. While these inhibitors are highly satisfactory for the stabilization of gasoline, they have the disadvantage that they themselves tend to undergo discoloration in the presence of oxygen and, if highly oxidized, may lose inhibitor potency. Discoloration of the inhibitor is also objectionable when the inhibitor is used in water-white gasoline.

Similarly, various metal deactivators have heretofore been proposed to prevent or at least substantially retard the catalytic effect of minute quantities of metals, which metals catalyzed the oxidative deterioration of organic materials. Examples of such metal deactivators are ethylene diamine tetraacetic acid and related compounds, the reaction product obtained by the condensation of a mono- or a polyhydroxybenzaldehyde, which may or may not be substituted with alkyl groups, with anthranilic acid which may or may not be substituted with alkyl groups, the reaction product obtained by the condensation of an alkali metal salt of an alpha primary amino aliphatic carboxylic acid with an ortho-hydroxy aromatic aldehyde which may or may not be further substituted with hydroxy or alkyl groups, and α-picolinic acid and related compounds such as α-quinoline carboxylic acid, etc.

The present invention offers a novel method of inhibiting organic compounds with phenylene diamine type inhibitors, freeing said organic compounds of deleterious metals, and lowering said organic compounds in mercaptan and phenol content. In the past it has been necessary to retain the phenylene diamine type inhibitors in an inert atmosphere in order to avoid the undesirable oxidation thereof, and the necessity for the use of an inert atmosphere is avoided by the novel features of the present invention.

In one embodiment the present invention comprises an organic compound, which tends to undergo deterioration by oxygen catalyzed by presence of minute quantities of certain metals, containing, as an inhibitor-metal deactivator for said deterioration, an inhibitor-metal deactivator comprising the product formed by the reaction of a phenylene diamine type inhibitor with an acid type metal deactivator.

Another embodiment of the present invention relates to a method of stabilizing an organic material which comprises adding a phenylene diamine salt of an acid type metal deactivator to said organic material, and thereafter treating the same with an alkaline reagent.

Another embodiment of the present invention relates to novel compositions of matter which comprise the products formed by the reaction of a phenylene diamine type inhibitor with an acid type metal deactivator.

In a specific embodiment the present invention relates to a method of stabilizing olefinic gasoline containing hydrogen sulfide and phenols which comprises commingling therewith from about 0.0001% to about 0.1% by weight of an N,N'-di-sec-butyl-p-phenylene diamine salt of an acid type metal deactivator, and thereafter treating the same with caustic to remove hydrogen sulfide and phenols and at the same time converting said N,N'-di-sec-butyl-p-phenylene diamine salt of an acid type metal deactivator to N,N'-di-sec-butyl-p-phenylene diamine and the sodium salt of the said metal deactivator.

The phenylene diamine type inhibitors to which the present invention is directed preferably are p-phenylene diamines and more preferably p-phenylene diamines in which one of the hydrogen atoms attached to at least one of the nitrogen atoms is replaced by an alkyl group and particularly propyl, butyl, and amyl radicals. Although the ortho- and meta-phenylene diamines may be used, they generally do not possess the high inhibitor potency of the p-substituted compounds. Similarly, while other alkyl radicals may replace one or more of the hydrogen atoms attached to the nitrogen atoms, the iso-propyl, sec-butyl, tert-butyl, sec-amyl, and tert-amyl substituted compounds are preferred. A particularly preferred p-phenylene diamine inhibitor comprises N,N'-di-sec-butyl-p-phenylene diamine.

In accordance with the present invention, the p-phenylene diamine salt of the acid type metal deactivator is prepared. This salt is considerably more stable to atmospheric oxygen than is the corresponding phenylene diamine and, therefore, permits the transportation and storing of the inhibitor compound without the necessity of using an inert gas blanket. The phenylene diamine salt is readily obtained by reacting the phenylene diamine with a concentrated solution of the desired acid type metal deactivator. In general, it is preferred to add the inhibitor slowly with constant stirring to the metal deactivator or to a solution of the metal deactivator in a suitable solvent such as alcohol, ether, ketone, etc. The phenylene diamine salt of the metal deactivator may then be concentrated and recovered in any suitable manner, such as by washing under vacuum with a suitable solvent.

In accordance with the invention, a solution of the phenylene diamine salt of the metal deactivator is added to the organic material to be stabilized before the latter is subjected to a refining treatment with an alkaline material. As applied to cracked gasoline, the gasoline generally contains hydrogen sulfide and phenols and is usually treated within a short time after it is produced in order to remove the hydrogen sulfide. It is objectionable to store cracked gasoline containing hydrogen sulfide for long periods of time because the hydrogen sulfide will be oxidized to sulfur and thereby result in a corrosive mixture. Similarly, as applied to cracked gasoline, the gasoline generally contains minute quantities of metals such as copper, iron, cobalt, nickel, chromium, lead, etc. which have a detrimental effect on the stabilization of the gasoline. It is a particular feature of the present invention that the phenylene diamine salt of a metal deactivator be commingled with the gasoline prior to or simultaneously with the caustic to remove hydrogen sulfide. The treatment of gasoline to remove hydrogen sulfide is generally effected by passing the gasoline through a body of caustic in a treating zone. The hydrogen sulfide reacts with the caustic to form sodium sulfide, and after the caustic solution has lost its activity, it is discarded. It is preferred to commingle the phenylene diamine salt of a metal deactivator with the gasoline on its way to the caustic treating zone. In view of the fact that the phenylene diamine salt of the metal deactivator is generally insoluble in gasoline, it may be necessary to utilize conventional mixers, orifices, and the like in order to effect the desired mixing, and to pump an emulsion of gasoline and the phenylene diamine salt of the metal deactivator into said gasoline containing hydrogen sulfide and phenols.

In the caustic treating zone, the caustic reacts with the phenylene diamine salt of the metal deactivator to form the corresponding phenylene diamine and an alkali metal salt of the metal deactivator, as for example, the tetra-sodium salt of ethylene diamine tetraacetic acid from the phenylene diamine salt of ethylene diamine tetra-acetic acid. The phenylene diamine is soluble in the gasoline and will be retained therein, while the alkali metal salt of the metal deactivator will be distributed in both the gasoline and caustic solutions according to its solubility in each. Immediately thereupon the alkali metal salt of the metal deactivator will chelate the minute quantities of metals present, said metals otherwise tending to catalyze the oxidative deterioration of the gasoline. Thus some of the chelated metals will undoubtedly be present in an inactive form in the gasoline, while a major portion of the chelated metals, will be later discarded with the caustic solution which is itself discarded when sufficiently contaminated with sodium sulfide.

In place of caustic any suitable alkaline agent that will remove hydrogen sulfide and which will react with the phenylene diamine salt of the metal deactivator to form the corresponding phenylene diamine and the inorganic salt of the metal deactivator may be used. Suitable alkaline reagents include potassium hydroxide, barium hydroxide, lithium hydroxide, sodium carbonate, etc.

It has been found that the phenylene diamine compound is completely retained in the gasoline and that the inhibitor activity obtained through the use of the metal deactivator salt is high and will stabilize the gasoline to a great degree. The inhibitor-metal deactivator compound of the present invention will usually be added to gasoline in an amount less than 0.1% by weight and generally will be utilized in an amount from about 0.0001% to about 0.01%. The exact amount required will depend upon the particular organic substance treated and upon the potency of the specific inhibitors-metal deactivator selected. These inhibitors-metal deactivators may also be employed in conjunction with various dyes, antiknock agents such as tetraethyl lead, or other additives employed for specific purposes in organic materials.

While it has been found that the acid type metal deactivator is distributed between the gasoline and the caustic phase, the metal deactivation obtained through the use of the phenylene diamine salt of an acid type metal deactivator is high and chelation of the minute quantities of metals present does occur.

Selection of the specific phenylene diamine-metal deactivator salt as hereinbefore stated will depend both on the organic material to be stabilized and upon the amount of minute metals present in said organic material.

Another important advantage to the features of the present invention is that the inhibitor-metal deactivator is added to the gasoline shortly after it is produced and is generally not more than about three days thereafter. As hereinbefore set forth, the phenylene diamine salt of an acid type metal deactivator is added to the gasoline prior to caustic treating to remove hydrogen sulfide, which treatment is effected shortly after the gasoline is produced. The inhibitor and metal deactivator are, therefore, incorporated into the gasoline before the gasoline is subjected to contact with air either in storage or during the subsequent treating operations to remove mercaptans. The subsequent treating operations may comprise a regenerative caustic treating process in which a solutizer is added to the caustic as, for example, methyl alcohol, potassium isobutyrate, etc., the doctor treating process, etc. Particularly in the doctor treating process, the treating reagent is air blown and the gasoline is contacted with the regenerated reagent, which means that the gasoline is subjected to contact with the air entrained in the treating solution.

The following examples are introduced to ilustrate further the novelty and utility of the present invention, but not with the intention of unduly limiting the same.

*Example I*

Pennsylvania thermally cracked gasoline is utilized as the organic material in the following examples, I and II. The potency of the inhibitor and the metal deactivator is reported in terms of induction period, which is an accelerated test employed to evaluate the storage stability of gasoline.

The cracked gasoline without added inhibitor has an induction period of 105 minutes. Upon the addition of one part per million of copper, as copper oleate, the induction period of this same gasoline drops to 55 minutes. Upon the addition of 0.003% by weight of an inhibitor consisting of N,N'-di-sec-butyl-p-phenylene diamine, the induction period of the gasoline containing the copper is raised to 300 minutes, while a sample of the same gasoline in which no added copper is present, has its induction period raised to 450 minutes by the addition of the same amount of the same inhibitor.

The N,N'-di-sec-butyl-p-phenylene diamine salt of alpha-picolinic acid was prepared by slowly adding N,N'-di-sec-butyl-p-phenylene diamine to a solution of alpha-picolinic acid in methanol and constantly stirring the mixture. Upon evaporation of the methanol, a pinkish crystalline mass was formed and this material was washed in the Buchner funnel with acetone. The thus purified reaction product consisted of oval transparent crystals, soluble in methanol, partially soluble in acetone, insoluble in ethyl ether, benzene, and paraffins, and had a sharp melting point at 139° C. Alpha-picolinic acid melts from 137–139° C. A mixture of alpha-picolinic acid and of the N,N'-di-sec-butyl-p-phenylene diamine salt of alpha-picolinic acid had a mixed melting point of 124° C., the melting point of each pure substance being lowered by the presence of the other.

0.005% by weight of the above mentioned crystals is added in methanolic solution (equivalent to 0.003% by weight of the N,N'-di-sec-butyl-p-phenylene diamine inhibitor and 0.002% by weight of the alpha-picolinic acid metal deactivator) to another sample of the Pennsylvania cracked gasoline containing 1 part per million of copper, and the product is washed with 10% by volume of 10% caustic solution. The induction period of the gasoline so treated is 460 minutes.

In order to show that the results obtained by adding the inhibitor salt of an acid type metal deactivator are superior to the results obtained by adding the inhibitor directly and not because of the caustic wash itself, 0.003% by weight of N,N'-di-sec-butyl-p-phenylene diamine is added to another sample of the Pennsylvania cracked gasoline containing one part per million of copper, the mixture is washed with 10% by volume of 10% sodium hydroxide solution. The induction period of the gasoline so treated is 300 minutes.

*Example II*

The N,N'-di-sec-butyl-p-phenylene diamine salt of ethylene diamine tetra-acetic acid was prepared by slowly adding N,N'-di-sec-butyl-p-phenylene diamine to a solution of ethylene diamine tetra-acetic acid in water and constantly stirring the mixture. The mixture was stirred for an additional hour and a clear pink solution was obtained. This solution was allowed to stand for 24 hours, after which the water was removed by evaporation on a steam bath. A crystalline mass was formed and this material was washed in a Buchner funnel with heptane and then with benzene. The thus purified reaction product consisted of prismatic crystals, soluble in hot water, slightly soluble in methanol and acetone, and insoluble in ethyl ether, benzene, and paraffins, and had a melting point at 181° C. Ethylene diamine tetra-acetic acid melts at 238° C. A mixture of ethylene diamine tetra-acetic acid and the N,N'-di-sec-butyl-p-phenylene diamine salt of ethylene diamine tetra-acetic acid had a mixed melting point of 205° C., the melting point of each pure substance being changed by the presence of the other.

0.007% by weight of the above mentioned crystals is added in an aqueous solution (equivalent to 0.003% by weight of the N,N'-di-sec-butyl-p-phenylene diamine inhibitor and 0.004% by weight of the ethylene diamine tetra-acetic acid metal deactivator) to another sample of the Pennsylvania cracked gasoline containing one part per million of copper and the product is washed with 10% by volume of 10% caustic solution. The induction period of the gasoline so treated is 460 minutes.

Similarly, in order to show that the results obtained by adding this inhibitor salt of an acid type metal deactivator are superior to the results obtained by adding the inhibitor directly and not because of the caustic wash itself. 0.003% by weight of N,N'-di-sec-butyl-p-phenylene diamine is added to another sample of the Pennsylvania cracked gasoline containing one part per million of copper and the mixture is washed with 10% by volume of sodium hydroxide solution. The induction period of the gasoline so treated is 300 minutes.

*Example III*

As another example to demonstrate the utility of these p-phenylene diamine salts of acid type metal deactivators, 0.02% of the N,N'-di-sec-butyl-p-phenylene diamine salt of alpha-picolinic acid, and 0.02% of the N,N'-di-sec-butyl-p-phenylene diamine salt of ethylene diamine tetraacetic acid are slowly added to samples of lard. The development of rancidity in these two lard samples is followed by the so-called Active Oxygen Method, a standard test for following the development of rancidity of lard, in comparison to a control sample. The control sample becomes rancid in approximately three hours time, the sample containing 0.02% of the N,N'-di-sec-butyl-p-phenylene diamine salt of alpha-picolinic acid becomes rancid in 21 hours, and the sample containing 0.02% of the N,N'-di-sec-butyl-p-phenylene diamine salt of ethylene diamine tetraacetic acid becomes rancid in 24 hours. Similarly, 0.02% of N,N'-di-sec-butyl-p-phenylene diamine is added to another sample of the same lard and rancidity, as measured by the Active Oxygen Method, is detected in 15 hours.

*Example IV*

As another example, to one sample of rubber containing natural rubber, sulfur, zinc oxide, carbon black, synthetic rubber, palm oil, and hexamethylene tetraamine, is added 0.5% of the N,N'-di-sec-butyl-p-phenylene diamine salt of α-picolinic acid; to another sample of the same rubber is added 0.5% of the N,N'-di-sec-butyl-p-phenylene diamine salt of ethylene diamine tetraacetic acid; to another sample is added 0.5% of N,N'-di-sec-butyl-p-phenylene diamine; and another sample is used as a control. After vulcanization in a press for 45 minutes at 294° F. to produce an optimum quality, the compositions containing the p-phenylene diamine salts of the acid-type metal deactivators deteriorate only approximately one-half as fast as the control composition when subjected to an accelerated ageing test such as the Greer oven test. The composition containing N,N'-di-sec-butyl-p-phenylene diamine deteriorates in a slightly but perceptibly faster rate than the compositions containing the p-phenylene diamine salts of the acid-type metal deactivators.

*Example V*

The following table illustrates the beneficial results obtained by treating alfalfa with the inhibitor-metal deactivators of the present invention. Inhibitor-metal deactivator A comprises the N,N'-di-sec-butyl-p-phenylene diamine salt of α-picolinic acid, inhibitor-metal deactivator B comprises the N,N'-di-sec-butyl-p-phenylene diamine salt of ethylene diamine tetraacetic acid, and inhibitor C comprises N,N'-di-sec-butyl-p-phenylene diamine. The alfalfa used contains 28 milligrams of carotene per 100 grams of alfalfa. In order to assist in distributing the small amount of additive throughout the alfalfa, the additive is added as a solution in methanol. The sample of alfalfa to be used as a blank or control run (no addition of inhibitor-metal deactivator or of inhibitor) is similarly treated with the same amount of methanol in order to show that the improved results are not due to the methanol solvent used.

| Inhibitor-Metal Deactivator or Inhibitor | Percent Active Inhibitor-Metal Deactivator or Inhibitor (Based on the Weight of Alfalfa) | Percent of Carotene Lost at The End of 7 Wks. | |
|---|---|---|---|
| | | Temperature | |
| | | 75° F. | 125° F. |
| None | | 50.0 | 77.2 |
| A | 0.10 | 6.3 | 28.0 |
| B | 0.10 | 6.5 | 30.2 |
| C | 0.10 | 6.1 | 35.0 |

The effectiveness of these p-phenylene diamine salts of acid-type metal deactivators for use for the retention of carotene in alfalfa is readily apparent by the data in the above table.

I claim as my invention:
1. An organic material subject to oxidative deterioration containing, in sufficient amount to retard said deterioration, an N,N'-di-sec-butyl-p-phenylene diamine salt of an acid selected from the group consisting of ethylene diamine tetraacetic acid and alpha-picolinic acid.
2. Olefinic gasoline containing as an inhibitor for oxidative deterioration the N,N'-di-sec-butyl-p-phenylene diamine salt of ethylene diamine tetraacetic acid in a sufficient amount to retard said deterioration.
3. Olefinic gasoline containing as an inhibitor for oxidative deterioration the N,N'-di-sec-butyl-p-phenylene diamine salt of alpha-picolinic acid in a sufficient amount to retard said deterioration.
4. Lard subject to oxidative deterioration containing, in sufficient amount to retard said deterioration, the N,N'-di-sec-butyl-p-phenylene diamine salt of an acid selected from the group consisting of ethylene diamine tetraacetic acid and alpha-picolinic acid.
5. Rubber subject to oxidative deterioration containing, in sufficient amount to retard said deterioration, the N,N'-di-sec-butyl-p-phenylene diamine salt of an acid selected from the group consisting of ethylene diamine tetraacetic acid and alpha-picolinic acid.
6. Crops having a carotene content normally subject to oxidative deterioration containing, in sufficient amount to retard said deterioration, the N,N'-di-sec-butyl-p-phenylene diamine salt of an acid selected from the group consisting of ethylene diamine tetraacetic acid and alpha-picolinic acid.
7. A method of stabilizing cracked gasoline which comprises adding thereto the N,N'-di-sec-butyl-p-phenylene diamine salt of ethylene diamine tetraacetic acid in a sufficient amount to retard oxidative deterioration, and thereafter washing the gasoline with an alkali metal hydroxide solution to convert said salt to N,N'-di-sec-butyl-p-phenylene diamine and an alkali metal salt of ethylene diamine tetraacetic acid.
8. A method of stabilizing cracked gasoline containing hydrogen sulfide which comprises commingling from about 0.0001% to about 0.1% by weight of the N,N'-di-sec-butyl-p-phenylene diamine salt of ethylene diamine tetraacetic acid with said gasoline and thereafter washing the same with sodium hydroxide solution to remove hydrogen sulfide and to convert said salt to N,N'-di-sec-butyl-p-phenylene diamine and the sodium salt of ethylene diamine tetraacetic acid.
9. A method of stabilizing cracked gasoline containing hydrogen sulfide which comprises commingling the N,N'-di-sec-butyl-p-phenylene diamine salt of alpha-picolinic acid with said gasoline and thereafter treating the same with caustic solution to remove hydrogen sulfide and to convert said salt to N,N'-di-sec-butyl-p-phenylene diamine and the sodium salt of alpha-picolinic acid.
10. An N,N'-di-sec-butyl-p-phenylene diamine salt of an acid selected from the group consisting of ethylene diamine tetraacetic acid and alpha-picolinic acid.
11. The N,N'-di-sec-butyl-p-phenylene diamine salt of ethylene diamine tetraacetic acid.
12. The N,N'-di-sec-butyl-p-phenylene diamine salt of alpha-picolinic acid.
13. A phenylene diamine salt of an acid selected from the group consisting of ethylene diamine tetra-acetic acid and alpha-picolinic acid, the phenylene diamine component of said salt being selected from the group consisting of para-phenylene diamine and its N-alkyl derivatives having not more than 5 carbon atoms in the alkyl radical.
14. Olefinic gasoline subject to oxidative deterioration containing, in sufficient amount to retard said deterioration, an N,N'-di-sec-butyl-p-phenylene diamine salt of an acid selected from the group consisting of ethylene diamine tetraacetic acid and alpha-picolinic acid.
15. A method of stabilizing olefinic gasoline which comprises adding to the gasoline, in sufficient amount to retard oxidative deterioration, an N,N'-di-sec-butyl-p-phenylene diamine salt of an acid selected from the group consisting of ethylene diamine tetraacetic acid and alpha-picolinic acid, and thereafter washing the gasoline with an alkali metal hydroxide solution to convert said salt to N,N'-di-sec-butyl-p-phenylene diamine and an alkali metal salt of said acid.

16. A method of stabilizing olefinic gasoline which comprises adding to the gasoline, in sufficient amount to retard oxidative deterioration, an N,N'-di-sec-butyl-p-phenylene diamine salt of ethylene diamine tetraacetic acid, and thereafter washing the gasoline with sodium hydroxide solution to convert said salt to N, N'-di-sec-butyl-p-phenylene diamine and the sodium salt of ethylene diamine tetraacetic acid.

17. An organic material subject to oxidative deterioration containing, in sufficient amount to retard said deterioration, a phenylene diamine salt of an acid selected from the group consisting of ethylene diamine tetraacetic acid and alpha-picolinic acid, the phenylene diamine component of said salt being selected from the group consisting of para-phenylene diamine and its N-alkyl derivatives having not more than 5 carbon atoms in the alkyl radical.

18. Olefinic gasoline subject to oxidative deterioration containing, in sufficient amount to retard said deterioration, a phenylene diamine salt of an acid selected from the group consisting of ethylene diamine tetraacetic acid and alpha-picolinic acid, the phenylene diamine component of said salt being selected from the group consisting of para-phenylene diamine and its N-alkyl derivatives having not more than 5 carbon atoms in the alkyl radical.

References Cited in the file of this patent

UNITED STATES PATENTS

| | | |
|---|---|---|
| 2,276,158 | Chenicek | Mar. 10, 1942 |
| 2,329,251 | Chenicek | Sept. 14, 1943 |
| 2,363,777 | Downing et al. | Nov. 28, 1944 |
| 2,496,930 | Brimer | Feb. 7, 1950 |
| 2,512,297 | Biswell et al. | June 20, 1950 |
| 2,560,744 | Rhines | July 17, 1951 |
| 2,605,250 | Hunter | July 29, 1952 |

OTHER REFERENCES

"Ind. Eng. Chem.," vol. 42, pages 922–5 (1950).